(12) United States Patent
Autterson (10) Patent No.: US 10,350,862 B1
(45) Date of Patent: Jul. 16, 2019

(54) COMBINATION VEHICLE INTERIOR TRIM COMPONENT AND ANTI-SHATTER SELF-ADHESIVE TAPE MEMBER TO PREVENT FRAGMENTATION OR SHATTERING OF THE COMPONENT DURING AN AIR-BAG DEPLOYMENT, AND METHODS OF MAKING AND USING SAME

(71) Applicant: Christopher S Autterson, Novi, MI (US)

(72) Inventor: Christopher S Autterson, Novi, MI (US)

(73) Assignee: ARGENT INTERNATIONAL, INC., Plymouth, MI (US)

( * ) Notice: Subject to any disclaimer, the term of this patent is extended or adjusted under 35 U.S.C. 154(b) by 0 days.

(21) Appl. No.: 15/583,957

(22) Filed: May 1, 2017

Related U.S. Application Data

(60) Division of application No. 14/731,386, filed on Jun. 4, 2015, which is a continuation-in-part of application No. 13/239,955, filed on Sep. 22, 2011.

(60) Provisional application No. 61/454,899, filed on Mar. 21, 2011.

(51) Int. Cl.
*B60R 13/02* (2006.01)
*B32B 27/08* (2006.01)
*B32B 5/02* (2006.01)
*B32B 27/12* (2006.01)
*B32B 27/34* (2006.01)
*B32B 27/32* (2006.01)
*B32B 27/36* (2006.01)
*B32B 41/00* (2006.01)
*B32B 37/12* (2006.01)

(52) U.S. Cl.
CPC .............. *B32B 27/08* (2013.01); *B32B 5/022* (2013.01); *B32B 5/024* (2013.01); *B32B 27/12* (2013.01); *B32B 27/32* (2013.01); *B32B 27/34* (2013.01); *B32B 27/36* (2013.01); *B32B 37/1292* (2013.01); *B32B 41/00* (2013.01); *B60R 13/025* (2013.01); *B60R 13/0206* (2013.01); *B60R 13/0256* (2013.01); *B32B 2260/021* (2013.01); *B32B 2260/046* (2013.01); *B32B 2262/0253* (2013.01); *B32B 2262/0261* (2013.01); *B32B 2262/0276* (2013.01); *B32B 2405/00* (2013.01); *B32B 2571/00* (2013.01); *B32B 2605/08* (2013.01)

(58) Field of Classification Search
CPC . B60R 13/0206; B60R 13/02; B60R 13/0212; B60R 13/0218; B60R 13/025; B60R 13/0256
See application file for complete search history.

(56) References Cited

U.S. PATENT DOCUMENTS

2006/0186649 A1* 8/2006 Izumi .................. B60R 21/2165
280/732
2012/0244770 A1* 9/2012 Autterson ............... B32B 5/022
442/149

(Continued)

*Primary Examiner* — Gregory A Blankenship
(74) *Attorney, Agent, or Firm* — Irving M Weiner; Pamela S Burt; Weiner & Burt, P.C.

(57) ABSTRACT

A combination vehicle interior trim component and an anti-shatter self-adhesive tape member to prevent fragmentation or shattering of the component during an air-bag deployment in an interior of a vehicle, and methods of making and using the combination.

14 Claims, 7 Drawing Sheets

(56) References Cited

U.S. PATENT DOCUMENTS

| | | | |
|---|---|---|---|
| 2014/0312600 A1* | 10/2014 | Verner | B60R 13/025 280/728.2 |
| 2016/0121837 A1* | 5/2016 | Mazur | B29C 44/06 280/728.3 |
| 2016/0288463 A1* | 10/2016 | Fujiwara | C08K 5/10 |
| 2017/0173922 A1* | 6/2017 | Kim | B32B 21/045 |

* cited by examiner

FIG 21

COMBINATION VEHICLE INTERIOR TRIM COMPONENT AND ANTI-SHATTER SELF-ADHESIVE TAPE MEMBER TO PREVENT FRAGMENTATION OR SHATTERING OF THE COMPONENT DURING AN AIR-BAG DEPLOYMENT, AND METHODS OF MAKING AND USING SAME

CROSS REFERENCE TO RELATED APPLICATIONS

The present application is a divisional patent application of U.S. patent application Ser. No. 14/731,386 filed Jun. 4, 2015, which in turn is continuation-in-part of and claims priority from U.S. patent application Ser. No. 13/239,955 filed Sep. 22, 2011, which in turn is based on and claims priority from U.S. Provisional Patent Application Ser. No. 61/454,899 filed Mar. 21, 2011.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

BACKGROUND OF THE INVENTION

The present invention relates generally to a combination vehicle interior trim component and an anti-shatter self-adhesive tape member to prevent fragmentation or shattering of the component during an air-bag deployment in an interior of a vehicle, and methods of making and using same.

More particularly, the present invention relates to a combination vehicle interior trim component and an anti-shatter self-adhesive tape member to prevent fragmentation or shattering of the component during an air-bag deployment in an interior of a vehicle, including at least one anti-shatter self-adhesive tape member affixed to at least one predetermined location on the component to prevent fragmentation or shattering of the component during an air-bag deployment, and and methods of making and using same.

When an automotive side-curtain air bag deploys, plastic components in the interior of the automotive vehicle may shatter and become flying projectiles which may cause injury or death to the occupants of the vehicle.

It is a desideratum of the present invention to avoid the animadversions of conventional automotive interiors.

SUMMARY OF THE INVENTION

The present invention provides a combination vehicle interior trim component and an anti-shatter self-adhesive tape member to prevent fragmentation or shattering of the vehicle interior trim component during an air-bag deployment in an interior of a vehicle, comprising: a vehicle interior trim component selected from the group consisting of pillars, glove boxes, instrument panels, side curtains, and other vehicle interior trim components; at least one anti-shatter self-adhesive tape member strategically located and affixed to at least one predetermined location on said vehicle interior trim component; said anti-shatter self-adhesive tape member being designed, dimensioned, fabricated, and strategically located on said vehicle interior trim component to prevent fragmentation or shattering of said vehicle interior trim component during an air-bag deployment; said anti-shatter self-adhesive tape member comprising: a first layer of a first material to prevent fragmentation or shattering of said vehicle interior component during an air-bag deployment in the interior of the vehicle; said first material being selected from the group consisting of a woven fabric, a non-woven fabric, a non-reinforced plastic film, and a reinforced plastic film; said woven fabric being made from polyester, polypropylene, or nylon; said non-woven fabric being made from polyester, polypropylene, or nylon; said non-reinforced plastic film being made from polyester, polyethylene, or nylon; said reinforced plastic film being made from polyester, polyethylene, or nylon; and a second layer of a pressure-sensitive adhesive laminated to said first layer to form a single-coated anti-shatter self-adhesive tape member to prevent fragmentation or shattering of said vehicle interior trim components during an air-bag deployment in the interior of the vehicle.

The present invention also provides a method of preventing fragmentation or shattering of vehicle interior trim components in an interior of a vehicle during an air-bag deployment, comprising the steps of: determining areas of the vehicle interior trim components which require reinforcement; and strategically affixing at least one anti-shatter self-adhesive tape member to said areas which require reinforcement; and wherein said anti-shatter self-adhesive tape member comprises: a first layer of a first material to prevent fragmentation or shattering of said vehicle interior trim component during an air-bag deployment in the interior of the vehicle; said first material being selected from the group consisting of a woven fabric, a non-woven fabric, a non-reinforced plastic film, and a reinforced plastic film; said woven fabric being made from polyester, polypropylene, or nylon; said non-woven fabric being made from polyester, polypropylene, or nylon; said non-reinforced plastic film being made from polyester, polyethylene, or nylon; said reinforced plastic film being made from polyester, polyethylene, or nylon; and a second layer of a pressure-sensitive adhesive laminated to said first layer to form a single-coated anti-shatter self-adhesive tape member to prevent fragmentation or shattering of said vehicle interior trim components during an air-bag deployment in the interior of the vehicle.

It is an object of the present invention to provides Anti-Shatter Tape Member™ self-adhesive tape member comprising a self-adhesive fabric, plastic film, or reinforced plastic film which is utilized to prevent fragmentation or shattering of plastic components.

Another object is to provides an anti-shatter self-adhesive tape member to prevent fragmentation or shattering of plastic components especially during an air-bag deployment, comprising: a first layer of a predetermined material to prevent fragmentation or shattering plastic components; and a second layer of high-performance pressure-sensitive adhesive laminated to said first layer to form a single-coated anti-shatter self-adhesive tape member to prevent fragmentation or shattering of plastic components especially during an air-bag deployment.

The invention also provides an anti-shatter self-adhesive tape member to prevent fragmentation or shattering of plastic components especially during an air-bag deployment, comprising, in combination: plastic components susceptible to fragmentation or shattering during an air-bag deployment; a first layer of a predetermined material to prevent fragmentation or shattering said plastic components; and a second layer of high-performance pressure-sensitive adhesive laminated to said first layer to form a single-coated anti-shatter self-adhesive tape member to prevent fragmentation or shattering of said plastic components especially during an air-bag deployment; whereby the anti-shatter self-adhesive tape member is applied to said plastic components to prevent fragmentation or shattering of said plastic components during an air-bag deployment.

The invention also provides an anti-shatter self-adhesive tape member as described herein, wherein said first layer comprises a woven fabric.

The invention also provides an anti-shatter self-adhesive tape member as described herein, wherein said first layer comprises a non-woven fabric.

The invention also provides an anti-shatter self-adhesive tape member as described herein, wherein said first layer comprises a plastic film.

The invention also provides an anti-shatter self-adhesive tape member as described herein, wherein said first layer comprises a reinforced plastic film.

The invention also provides an anti-shatter self-adhesive tape member as described herein wherein said first layer comprises a woven fabric made from polyester, polypropylene, or nylon.

The invention also provides an anti-shatter self-adhesive tape member as described herein wherein said first layer comprises a non-woven fabric made from polyester, polypropylene, or nylon.

The invention also provides an anti-shatter self-adhesive tape member as described herein wherein said first layer comprises a plastic film made from polyester, polyethylene, or nylon.

The invention also provides an anti-shatter self-adhesive tape member as described herein wherein said first layer comprises a reinforced plastic film made from polyester, polyethylene, or nylon.

The invention also provides a method of preventing fragmentation or shattering of plastic components especially during an air-bag deployment, comprising the step of placing on one or more of the plastic components an anti-shatter self-adhesive tape member as described herein.

It is a primary object of the present invention to provide an Anti-Shatter Tape™ self-adhesive tape member as described herein which is used primarily in the automotive industry to prevent plastic components, such as A-pillars, from shattering upon deployment of side-curtain air bags.

Another object of the present invention is to provide a novel and unique Anti-Shatter Tape Member™ self-adhesive tape member as described herein, wherein such tape member is fabricated from various fabrics, both woven and non-woven, and reinforced or plain plastic films, and methods of constructing and utilizing same.

Yet another object of the present invention is to provide a novel and unique Anti-Shatter Tape™ self-adhesive tape member as described herein, wherein such films and fabrics have a high-performance pressure-sensitive adhesive layer laminated to them to create a single-coated tape member.

Yet another object of the present invention is to provide a novel and unique Anti-Shatter Tape Member™ self-adhesive tape member as described herein, wherein the tape member is strategically located and applied to the plastic components in the area or areas which require reinforcement.

Other objects, advantages, and features of the present invention will become apparent to those persons skilled in this particular area of technology and to other persons after having been exposed to the present patent application when read in conjunction with the accompanying patent drawings.

BRIEF DESCRIPTION OF THE DRAWINGS

FIGS. 2-6 illustrate enlarged cross-sectional views of four different embodiments of the present invention.

DETAILED DESCRIPTION OF THE INVENTION

The following detailed description is of the best currently contemplated modes of carrying out exemplary embodiments of the invention.

The description is not to be taken in a limiting sense, but is made merely for the purpose of illustrating the general principles of the invention.

Figure 1:
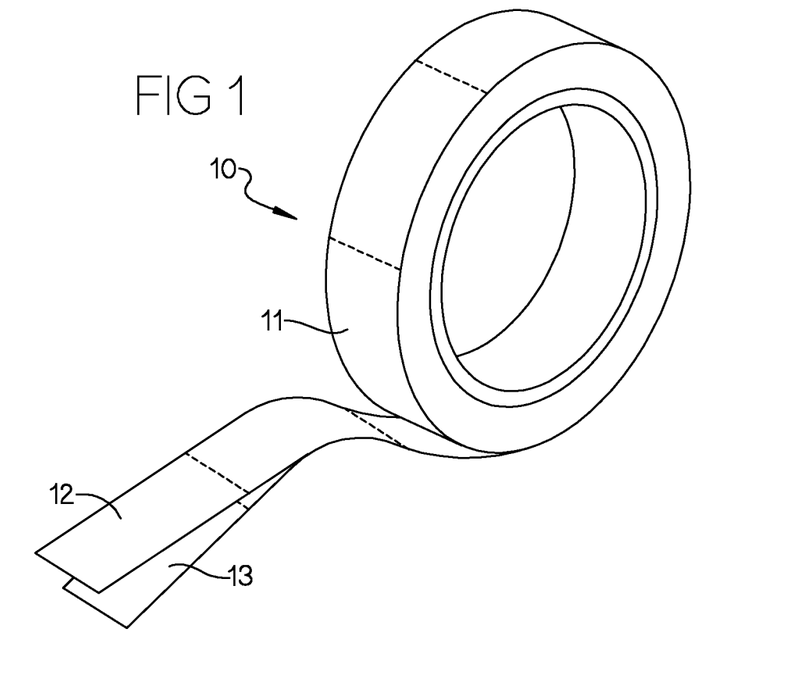
FIG. 1 is a perspective view of a first embodiment of the present invention.

With reference to FIG. 1, there is shown a roll 10 of Anti-Shatter Tape™ self-adhesive tape member 11 in accordance with a first embodiment of the present invention.

The tape member 11 comprises a self-adhesive fabric, plastic film, or reinforced plastic film 12 which is utilized to prevent fragmentation or shattering of plastic components.

More particularly, the tape member 11 helps prevent plastic fragmentation or shattering, and strategically contains projectiles during the deployment of air-bags.

The Anti-Shatter Tape™ self-adhesive tape member 11 (and the other pieces thereof described and illustrated hereinbelow) in accordance with the present invention may be fabricated from various fabrics, both woven and non-woven, and reinforced or plain films 12.

The aforementioned films and fabrics 12 are typically, but not always, fabricated from polyester, polypropylene, nylon, and/or polyethylene In accordance with the present invention, the aforementioned films and fabrics 12 have a high-performance pressure-sensitive adhesive layer 13 laminated to them to create the single coated tape member 11.

The adhesive layer 13 may preferably, but not necessarily, be composed of an acrylic adhesive.

Although film 12 and adhesive layer 13 are laminated together to form a single coated tape member 11, in FIG. 1 the end portion of tape member 11 is shown separated merely for the purpose of illustrating the component parts 12 and 13 of the integral laminated tape member 11.

The Anti-Shatter Tape™ self-adhesive tape member 11 (and the other pieces thereof described and illustrated hereinbelow) in accordance with the present invention is utilized to structurally reinforce automotive interior trim components, such as, for example, side curtain, pillars, glove box, instrument panel, etc.

The Ant-Shatter Tape™ self-adhesive tape member is not applied directly to air curtains or air bags.

Rather, the Ant-Shatter Tape™ self-adhesive tape member is applied to the components which are located near air curtains or air bags or covering air curtains or air bags to prevent such components from fragmenting during deployment of air curtains or air bags.

Figure 2:
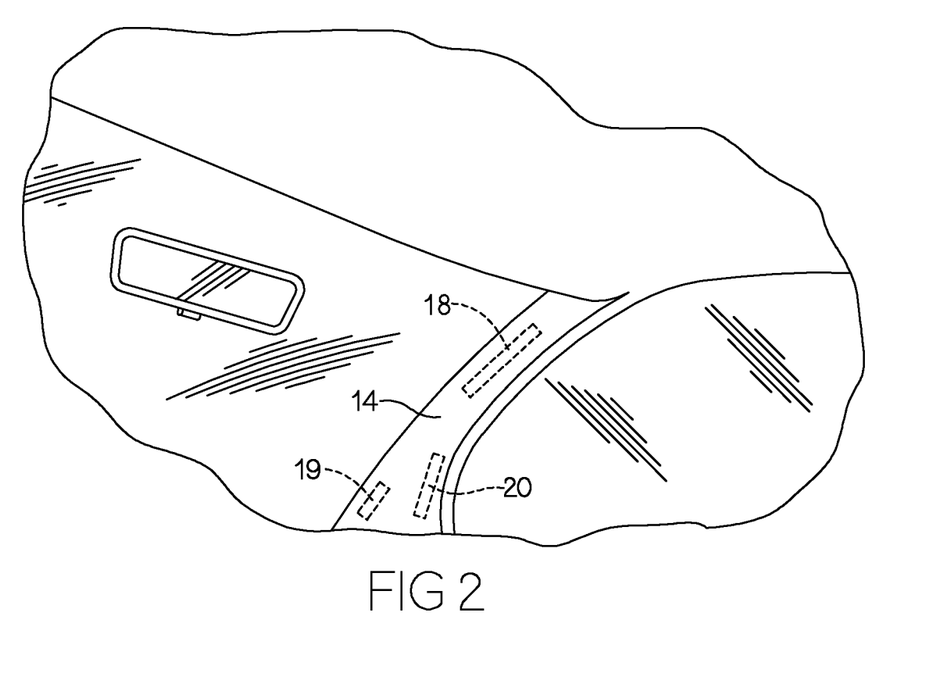
FIG. 2 is a perspective view of pieces of the Anti-Shatter Tape™ self-adhesive tape member affixed to a pillar of an automotive vehicle in accordance with the present invention.

With reference to FIG. 2, there is shown pieces 18, 19 and 20 of tape member 11 strategically affixed to an automotive pillar 14.

Figure 3:
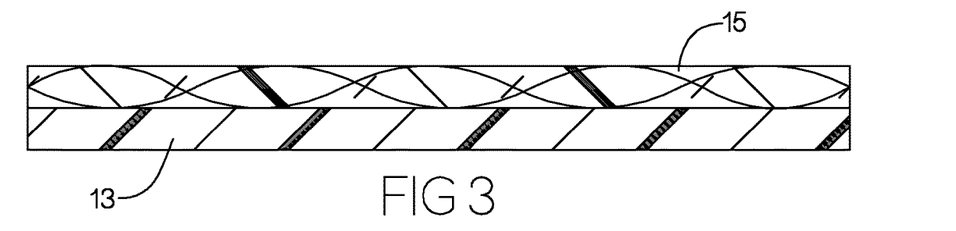

FIG. 3 illustrates that the tape member 11 may comprise a doubly-reinforced plastic film 15 laminated to a high-performance pressure-sensitive adhesive layer 13.

Figure 4:
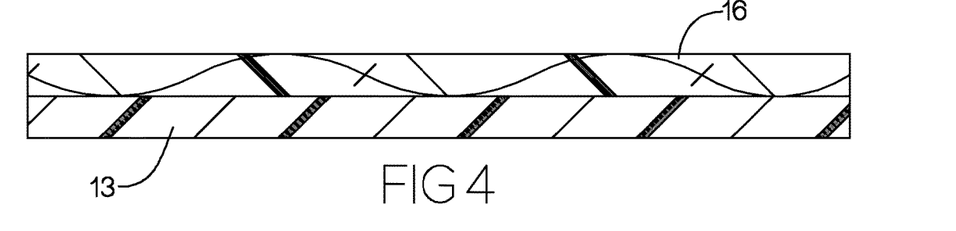

FIG. 4 illustrates that the tape member 11 may alternatively comprise a singly-reinforced plastic film 16 laminated to a high-performance pressure-sensitive adhesive layer 13.

Figure 5:
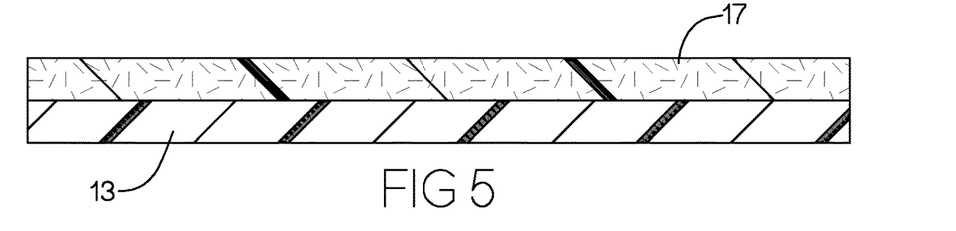

FIG. 5 illustrates that the tape member 11 may alternatively comprise a woven fabric film 17 laminated to a high-performance pressure-sensitive adhesive layer 13.

Figure 6:
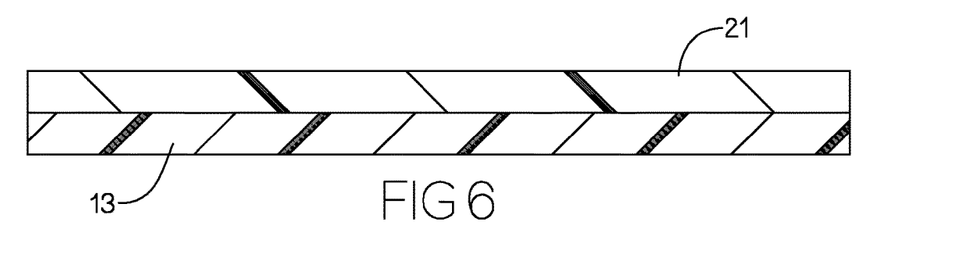

FIG. 6 illustrates that the tape member 11 may alternatively comprise a plain or unreinforced film 21 laminated to a high-performance pressure-sensitive adhesive layer 13.

Pieces of the Anti-Shatter Tape™ self-adhesive tape member 11 are strategically applied to the plastic components in the area or areas that require reinforcement.

For example, upon deployment of an automotive air-bag or curtain, the Anti-Shatter Tape™ self-adhesive tape member 11 helps maintain the affected plastic component or components in one piece and prevents fragmentation or shattering thereof.

This is extremely important because it is necessary to prevent potential projectiles from being released during an air-bag deployment.

Figure 7:
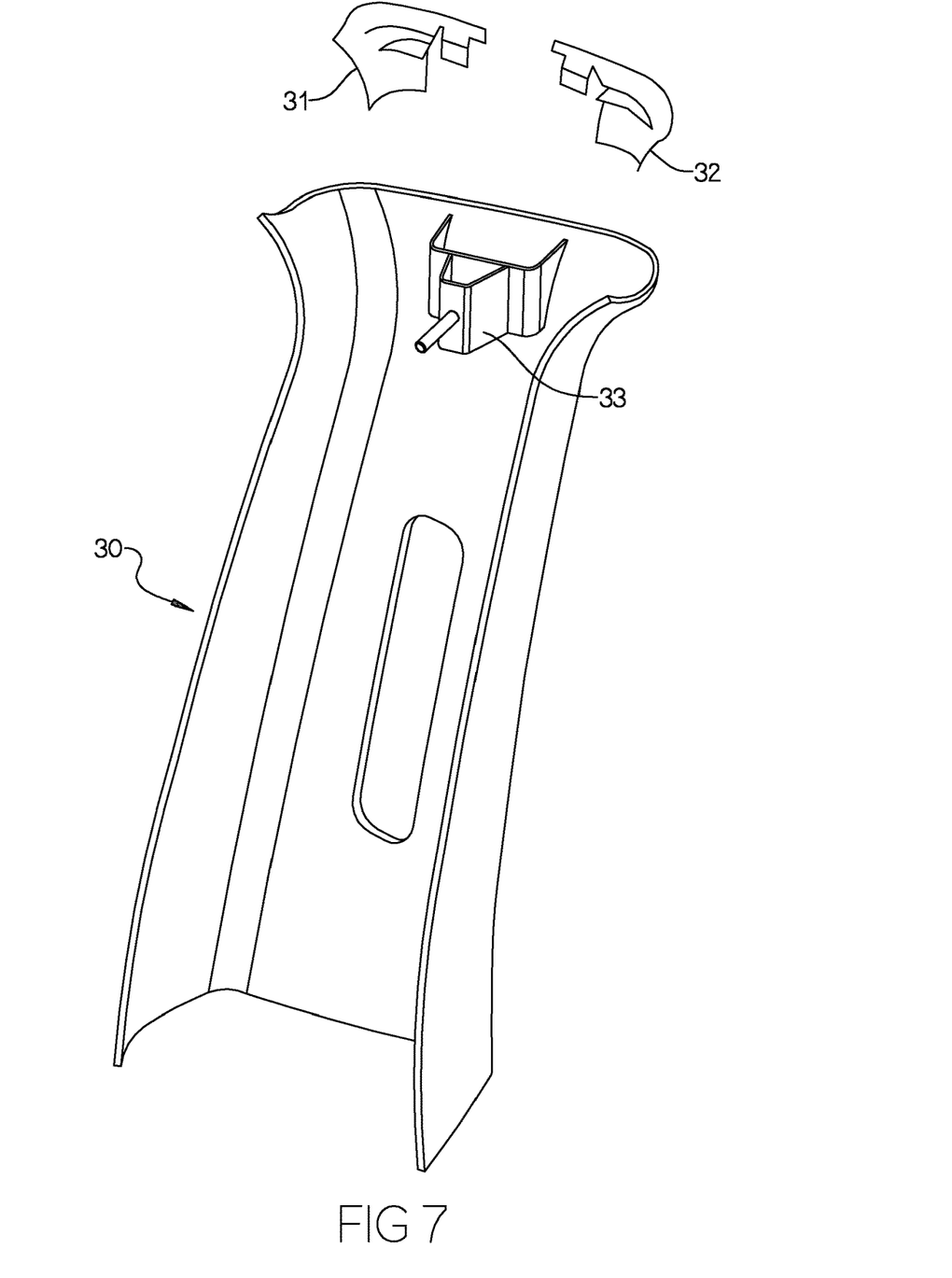
FIG. 7 shows an embodiment of the Anti-Shatter Tape™ self-adhesive tape member applied to the back of an automotive B-Pilar.

FIG. 7 shows an embodiment of the Anti-Shatter Tape™ self-adhesive tape member applied on the back side of an automotive B-Pilar 30, on each side of a doghouse/standoff structure 33.

Two complicated, specially designed pieces 31 and 32 of the Anti-Shatter Tape™ self-adhesive tape member are applied to and partially around the doghouse structure 33 in the upper portion of the back of the B-pilar 30 as shown in the upper part of FIG. 7.

Figure 8:
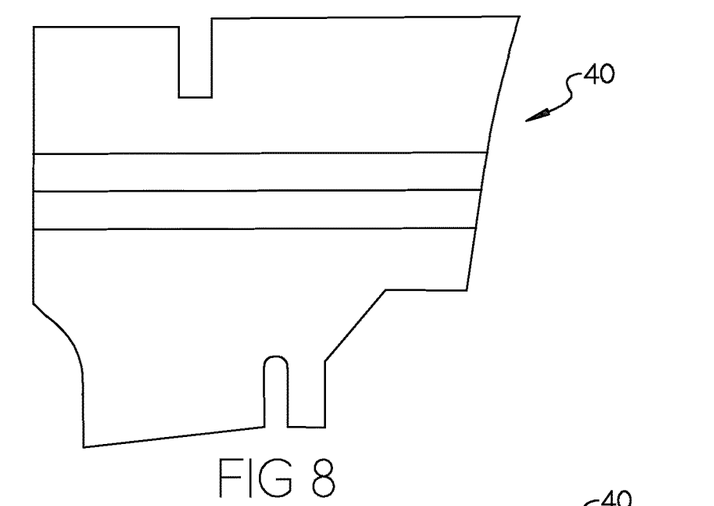
FIGS. 8 and 9 show a left hand part of a special shape Anti-Shatter Tape™ self-adhesive tape member.
Figure 9:
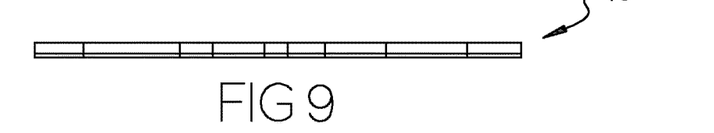

FIGS. 8 and 9 show a left hand part 40 of a special shape Anti-Shatter Tape™ self-adhesive tape member.

Figure 10:
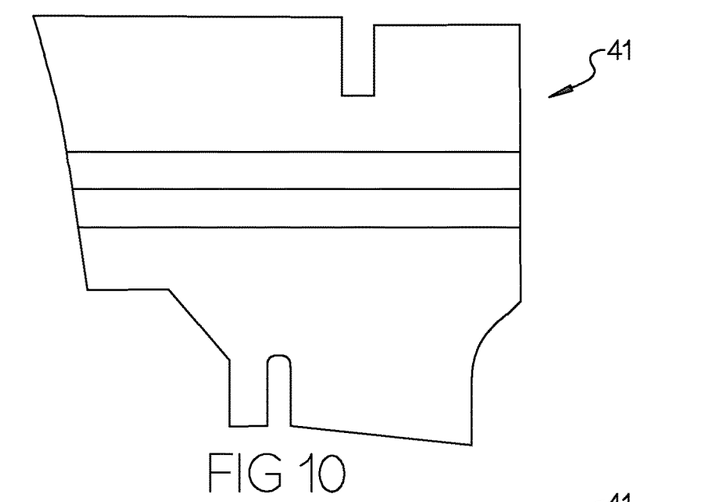
FIGS. 10 and 11 show a right hand part of a special shape Anti-Shatter Tape™ self-adhesive tape member.
Figure 11:
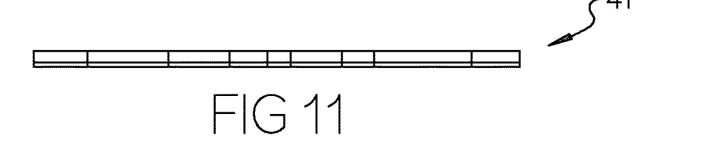

FIGS. 10 and 11 show a right hand part 41 of a special shape Anti-Shatter Tape™ self-adhesive tape member.

The parts shown in FIGS. 8-11 are located on the front of the door panel by the mirror.

Figure 12:
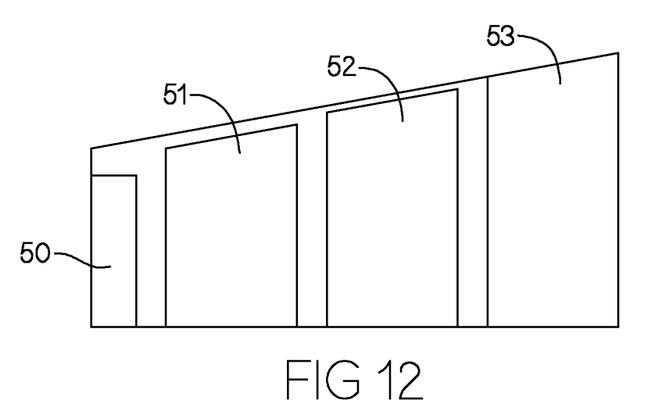
FIGS. 12 and 13 show a special shape set of 4 parts of the Anti-Shatter Tape™ self-adhesive tape member on a release liner.
Figure 13:
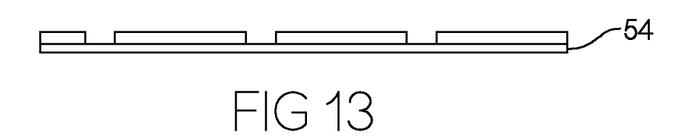

FIGS. 12 and 13 show a special shape set of four parts 50, 51, 52 and 53 of the Anti-Shatter Tape™ self-adhesive tape member on a release liner 54.

The parts shown in FIGS. 12 and 13 are located on the A-pilar of the vehicle.

Figure 14:
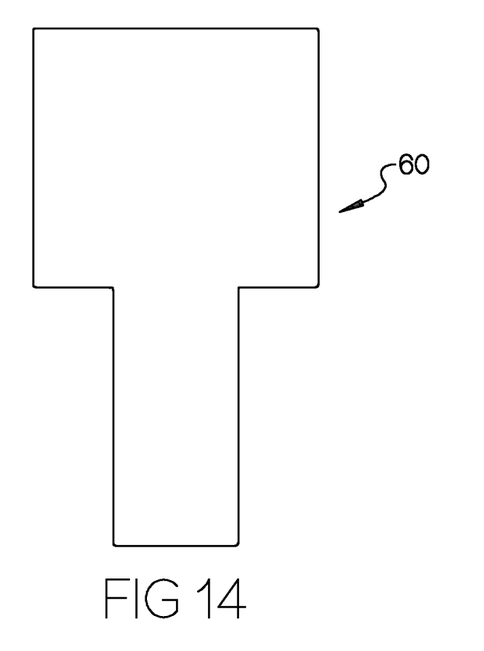
FIGS. 14 and 15 show another special shape of the Anti-Shatter Tape™ self-adhesive tape member.
Figure 15:
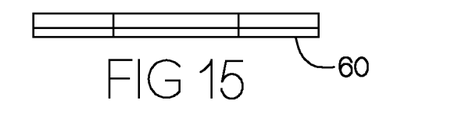

FIGS. 14 and 15 show another special shaped part 60 of the Anti-Shatter Tape™ self-adhesive tape member on a release liner 61.

Figure 16:
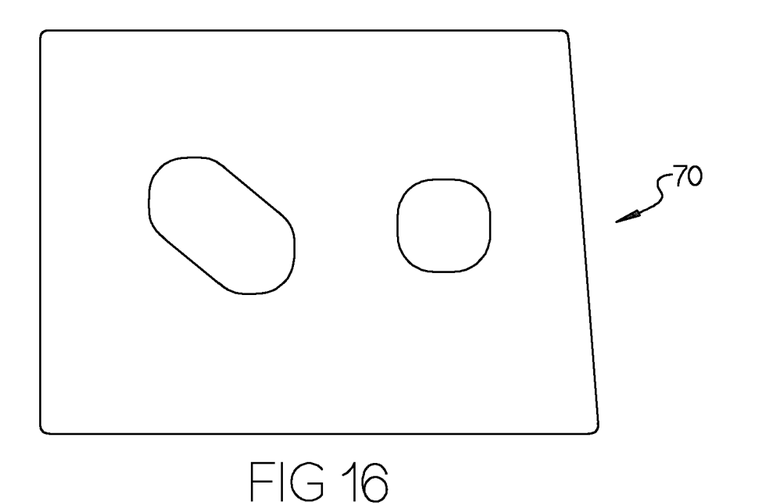
FIGS. 16 and 17 show a left hand part of another special shape Anti-Shatter Tape™ self-adhesive tape member.
Figure 17:
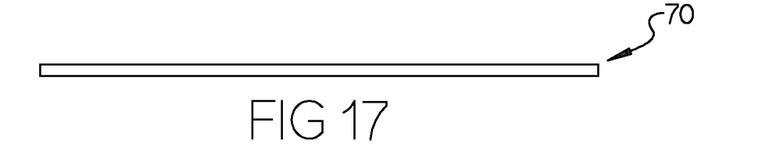

FIGS. 16 and 17 show a left hand part 70 of another special shape Anti-Shatter Tape™ self-adhesive tape member.

Figure 18:
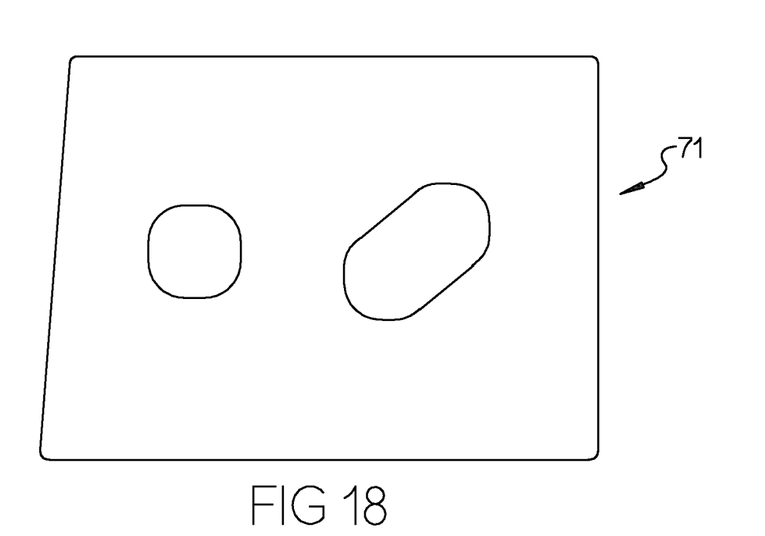
FIGS. 18 and 19 show a right hand part of another special shape Anti-Shatter Tape™ self-adhesive tape member.
Figure 19:
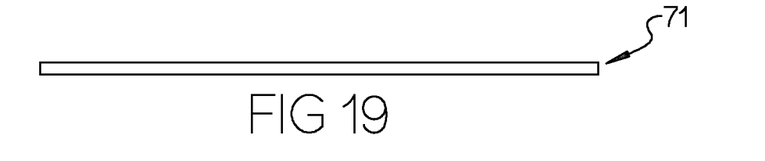

FIGS. 18 and 19 show a right hand part 71 of another special shape Anti-Shatter Tape™ self-adhesive tape member.

The parts shown in FIGS. 16-19 are located on the A-pilar in the vehicle.

Figure 20:
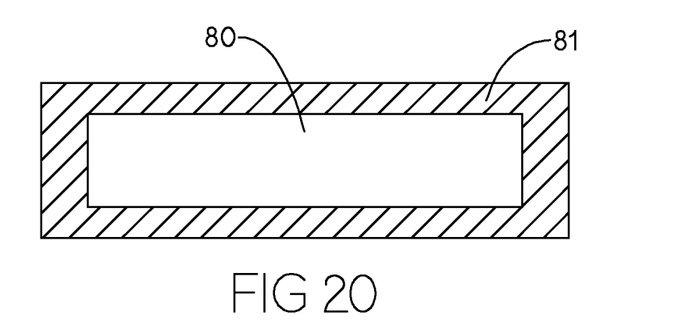
FIGS. 20 and 21 show another special shape Anti-Shatter Tape™ self-adhesive tape member.
Figure 21:
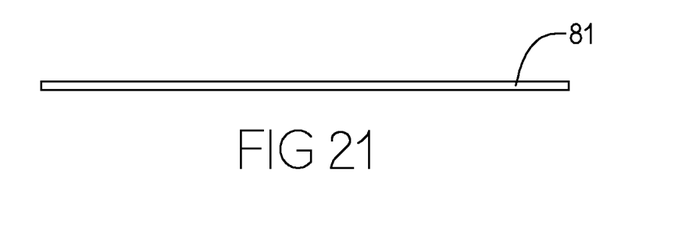

FIGS. 20 and 21 show another special shaped part 80 Anti-Shatter Tape™ self-adhesive tape member.

A blue printed band 81 is provided around the part 80.

As shown in FIG. 21, the part 80 is fabricated from polypropylene with fiber, and has a thickness 0.28 mm+/−10%

There have been illustrated in the accompanying drawings and described herein only several possible unique and novel embodiments of the present invention which can be practiced and constructed in many different embodiments, configurations, materials, arrangements of components, sizes, and shapes.

It should be understood that many changes, modifications, variations, and other uses and applications will become apparent to those persons skilled in this particular area of technology and to others after having been exposed to the present patent specification and accompanying patent drawings.

Any and all such changes, modifications, variations and other uses and applications which do not depart from the spirit and scope of the present invention are therefore covered by and embraced within claims set forth hereinbelow,

The invention claimed is:

1. A combination vehicle interior trim component and an anti-shatter self-adhesive tape member to prevent fragmentation or shattering of the vehicle interior trim component during an air-bag deployment in an interior of a vehicle, comprising, in combination:

a vehicle interior trim component selected from the group consisting of pillars, glove boxes, instrument panels, and side curtains;

at least one anti-shatter self-adhesive tape member affixed to at least one predetermined location on said vehicle interior trim component;

said anti-shatter self-adhesive tape member being designed, dimensioned, fabricated, and located strategically on said vehicle interior trim component to prevent fragmentation or shattering of said vehicle interior trim component during an air-bag deployment;

said anti-shatter self-adhesive tape member comprising:

a first layer of a first material to prevent fragmentation or shattering of said vehicle interior trim component during an air-bag deployment in the interior of the vehicle;

said first material being selected from the group consisting of a woven fabric, a non-woven fabric, a non-reinforced plastic film, and a reinforced plastic film;

said woven fabric being made from polyester, polypropylene, or nylon;

said non-woven fabric being made from polyester, polypropylene, or nylon;

said non-reinforced plastic film being made from polyester, polyethylene, or nylon;

said reinforced plastic film being made from polyester, polyethylene, or nylon; and a second layer of a pressure-sensitive adhesive laminated to said first layer to form a single-coated anti-shatter self-adhesive tape member to prevent fragmentation or shattering of said vehicle interior trim components during an air-bag deployment in the interior of the vehicle.

2. The combination according to claim 1, wherein:
said anti-shatter self-adhesive tape member includes a doubly-reinforced plastic film laminated to said pressure-sensitive adhesive second layer.

3. An anti-shatter self-adhesive tape member to prevent fragmentation or shattering of plastic components during an air-bag deployment, comprising, in combination:
plastic components susceptible to fragmentation or shattering during an air-bag deployment;
a first layer of a predetermined material to prevent fragmentation or shattering said plastic components; and
a second layer of high-performance pressure-sensitive adhesive laminated to said first layer to form a single-coated anti-shatter self-adhesive tape member to prevent fragmentation or shattering of said plastic components during an air-bag deployment;
whereby the anti-shatter self-adhesive tape member is applied to said plastic components to prevent fragmentation or shattering of said plastic components during an air-bag deployment.

4. An anti-shatter self-adhesive tape member to prevent fragmentation or shattering of plastic components during an air-bag deployment according to claim 3, wherein:
said first layer comprises a woven fabric.

5. An anti-shatter self-adhesive tape member to prevent fragmentation or shattering of plastic components during an air-bag deployment according to claim 3, wherein:
said first layer comprises a non-woven fabric.

6. An anti-shatter self-adhesive tape member to prevent fragmentation or shattering of plastic components during an air-bag deployment according to claim 3, wherein:
said first layer comprises a plastic film.

7. An anti-shatter self-adhesive tape member to prevent fragmentation or shattering of plastic components during an air-bag deployment according to claim 3, wherein:
said first layer comprises a reinforced plastic film.

8. An anti-shatter self-adhesive tape member to prevent fragmentation or shattering of plastic components during an air-bag deployment according to claim 3, wherein:
said first layer comprises a woven fabric made from polyester, polypropylene, or nylon.

9. An anti-shatter self-adhesive tape member to prevent fragmentation or shattering of plastic components during an air-bag deployment according to claim 3, wherein:
said first layer comprises a non-woven fabric made from polyester, polypropylene, or nylon.

10. An anti-shatter self-adhesive tape member to prevent fragmentation or shattering of plastic components during an air-bag deployment according to claim 3, wherein:
said first layer comprises a plastic film made from polyester, polyethylene, or nylon.

11. An anti-shatter self-adhesive tape member to prevent fragmentation or shattering of plastic components during an air-bag deployment according to claim 3, wherein:
said first layer comprises a reinforced plastic film made from polyester, polyethylene, or nylon.

12. A combination vehicle interior trim component and an anti-shatter self-adhesive tape member to prevent fragmentation or shattering of the vehicle interior trim component during an air-bag deployment in an interior of a vehicle, comprising, in combination:
a vehicle interior trim component selected from the group consisting of pillars, glove boxes, instrument panels, and side curtains;
at least one anti-shatter self-adhesive tape member affixed to at least one predetermined location on said vehicle interior trim component;
said anti-shatter self-adhesive tape member being designed, dimensioned, fabricated, and located strategically on said vehicle interior trim component to prevent fragmentation or shattering of said vehicle interior trim component during an air-bag deployment;
said anti-shatter self-adhesive tape member comprising:
a first layer of a first material to prevent fragmentation or shattering of said vehicle interior trim component during an air-bag deployment in the interior of the vehicle;
said first layer is a reinforced polyester plastic film; and
a second layer of a pressure-sensitive adhesive laminated to said first layer to form a single-coated anti-shatter self-adhesive tape member to prevent fragmentation or shattering of said vehicle interior trim components during an air-bag deployment in the interior of the vehicle.

13. The combination according to claim 12, wherein:
said anti-shatter self-adhesive tape member includes a doubly-reinforced plastic film laminated to said pressure-sensitive adhesive second layer.

14. A combination automotive B-Pilar component and an anti-shatter self-adhesive tape member to prevent fragmentation or shattering of the component during an air-bag deployment in an interior of a vehicle, comprising, in combination:
an automotive B-Pilar component including a doghouse/standoff structure;
two specially-designed pieces of an anti-shatter self-adhesive tape member applied on a back side of said automotive B-Pilar component;
said two specially-designed pieces of the anti-shatter self-adhesive tape member are applied to and partially around said doghouse/standoff structure of said automotive B-Pilar component;
the anti-shatter self-adhesive tape member comprising:
a first layer of a first material to prevent fragmentation or shattering of the automotive B-Pilar component during an air-bag deployment in the interior of the vehicle;
said first material being selected from the group consisting of a woven fabric, a non-woven fabric, a non-reinforced plastic film, and a reinforced plastic film;
said woven fabric being made from polyester, polypropylene, or nylon;
said non-woven fabric being made from polyester, polypropylene, or nylon;
said non-reinforced plastic film being made from polyester, polyethylene, or nylon;
said reinforced plastic film being made from polyester, polyethylene, or nylon; and
a second layer of a pressure-sensitive adhesive laminated to said first layer to form a single-coated anti-shatter self-adhesive tape member to prevent fragmentation or shattering of the automotive B-Pilar component during an air-bag deployment in the interior of the vehicle.

* * * * *